United States Patent Office 2,779,759
Patented Jan. 29, 1957

2,779,759
PROCESS OF OBTAINING HIGHLY PURIFIED STREPTOMYCIN SALTS

Teijiro Yabuta and Hiroshi Ikeda, Tokyo-to, Japan

No Drawing. Application August 27, 1952,
Serial No. 306,738

Claims priority, application Japan September 8, 1951

8 Claims. (Cl. 260—210)

This invention relates to a process of obtaining highly purified streptomycin salts, and it has for its object to provide a novel and improved process for this purpose.

It is known that streptomycin prepared from the elaboration product of *Streptomyces griseus* is usually obtained associated with undesirable impurities, which must be separated therefrom in order to obtain therapeutically useful product of high antibiotic potency. One of the processes of separating active products from the culture medium is by an adsorption on charcoal followed by elution with an acidic solvent, such as water or methanol acidified with hydrochloric acid, but this procedure yields streptomycin along with much extraneous material since many other substances are simultaneously absorbed and eluted. For this reason this process gives a product of low potency. Another process of separation of active streptomycin from the culture medium is by an adsorption on ion exchange resin followed by elution with a mineral acid. Streptomycin can also be recovered from the culture medium by precipitation as a water-insoluble azosulfonic acid dye salt, for example, the shalt of Congo red, helianthic acid or Naphthol Blue-Black. When converted directly by previously known processes to the therapeutically useful mineral acid salts, the crude product thus obtained is streptomycin salt of relatively low activity or antibiotic potency. The crude streptomycin salts can further be purified by lengthy and complicated procedures involving chromatographic methods. In other methods of purification, the streptomycin is converted to the reineckate or the helianthate and recrystallized before subsequent conversion to the desired mineral acid salt. The streptomycin is also purified by converting to the trihydrochloride calcium chloride double salt and by subsequent recrystallization.

An object of this invention is to provide an improved process of preparing therapeutically active salts of streptomycin of high potency. A further object is to provide an efficient and economical process of precipitating streptomycin, in the form of sparingly soluble salt in water, by combining the streptomycin in the crude solutions with a polyhalophenol. Still another object is to prepare a novel streptomycin-polyhalophenate which is useful in the preparation of other commercial streptomycin salts of high antibiotic activity. We have now found that streptomycin interacts with polyhalophenols to form a salt-type combination (streptomycin-polyhalophenate) which is sparingly soluble in water and very soluble in certain organic solvents; and it has also been found that the streptomycin-polyhalophenate may be decomposed to recover the streptomycin.

The process of this invention essentially comprises interacting a streptomycin with a polyhalophenol in a solvent (especially water). The precipitated streptomycin-polyhalophenate is sparingly soluble in water, and may be recovered by filtration, centrifugation or other suitable means when water is employed as the solvent for the reactants. After washing this precipitate with water, the precipitate is dissolved in an organic solvent, and the streptomycin-polyhalophenate therein is converted into a water-soluble salt of streptomycin, preferably by intimately contacting the organic solvent solution with an aqueous, water-soluble inorganic or organic acid or alkaline earth metal halide, and recovering the aqueous phase or precipitate. The water soluble salt of streptomycin recovered from the aqueous solution or precipitate thus obtained is purer than the streptomycin treated, and the recovery of streptomycin activity in the purification treatment is of a high order. By the practice of this invention, it is possible to obtain uniformly high yields of highly-purified streptomycin.

Among the polyhalophenols suitable for the purposes of this invention are those of the formula

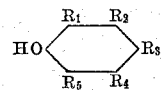

wherein, all of R ($R_1$–$R_5$) are halogen (chlorine, bromine of iodine), or at least four of them are halogen (chlorine, bromine or iodine).

Among the polyhalophenols utilizable in the practice of this invention are: pentachlorophenol; pentabromophenol; 2,3,4,6-tetrachlorophenol; 2,4,6 - trichloro - 3-bromophenol; 2,3,4,6-tetrabromophenol.

The organic solvents utilizable in the practice of this invention include, inter alia; aliphatic alcohols, such as n-amylalcohol (1-pentanol), n-butanol (1-butanol), methyl-isopropylcarbinol; aliphatic ketones, such as acetone; hydrocarbons, such as benzene and toluene; and halogenated hydrocarbons, such as ethylene dichloride, chloroform and carbon tetrachloride.

Among the water-soluble acids utilizable for recovery of the streptomycin from its polyhalophenate are sulfuric, hydrochloric, phosphoric, acetic, lactic and citric acid. Among the alkaline earth metal halides, the calcium chloride is mostly used. For maximum efficiency the amount of the alkali salt of polyhalophenol employed should be substantially that required to combine with all the streptomycin in the solution treated, the optimum amount of polyhalophenol being therefor dependent on the concentration of the streptomycin solution treated and the potency of the streptomycin. By using the stoichiometric amount of polyhalophenol (with respect to the streptomycin of the solution treated) one can obtain a practically quantitative recovery of the streptomycin as its polyhalophenate; and the substantially pure streptomycin-polyhalophenate obtained facilitates recovery of the streptomycin as a water-soluble salt.

In one embodiment of the invention, an aqueous solution of an impure streptomycin is treated with an aqueous solution of an alkali salt of a polyhalophenol, and the precipitate formed is recovered and converted into a water soluble salt of the streptomycin. Alternatively, the alkali salt of polyhalophenol may be added to the streptomycin solution in solid form; or both the streptomycin and the alkali salt of the polyhalophenol may be added in solid form to water (or other solvent for the reactants). The conversion of the streptomycin-polyhalophenate into a water-soluble salt of streptomycin may be effected in the following ways, inter alia: by dissolving the streptomycin-polyhalophenate in a solvent therefor (e. g. methanol), treating the solution with a water soluble, inorganic or organic acid, and recovering the formed water-soluble salt of streptomycin; by dissolving the streptomycin-polyhalophenate in a substantially water-immiscible organic solvent (e. g., n-pentanol), intimately contacting the solution with an aqueous, water soluble inorganic or organic acid, recovering the aqueous phase, and drying it; by dissolving the streptomycin-polyhalophenate in a solvent therefor in which the desired water-soluble salt is insoluble, treating the solution with an aqueous, water soluble acid, and recovering the precipitated water-soluble salt of streptomycin.

In general, during the regeneration of streptomycin hydrochloride or sulfate from the azo sulfonic acid dye salts (e. g., the helianthate, the salt of Naphthol-Blue-Black, or the salt of "Tergitol"), there is occasionally observed some inactivation which appears to be due to the lower regeneration rate of streptomycin acid salt from the above dye salts. Also, regeneration of streptomycin sulfate from streptomycin azo sulfonic acid dye salts using methanolic sulfuric acid gave on one occasion a considerable yield of crystalline streptidine sulfate. (Cf. R. L. Peck et al.; J. Am. Chem. Soc., 68, 29–1946) On the other hand, we discovered that the regeneration rate of streptomycin acid salt from streptomycin-polyhalophenate is very high, owing to the low acidity of the polyhalophenol, (e. g. $K_A$ (25°) of pentachlorophenol is $5.5 \times 10^{-6}$). Hence the regeneration of streptomycin salt from streptomycin-polyhalophenate is easily accomplished at the safe pH range without any hydrolysis of streptomycin.

In one method of practicing this invention, crude streptomycin trihydrochloride solution is obtained from fermentation broth by a carbon absorption and elution. The solution is charged with one portion of the total volume of sodium-pentachlorophenate required for precipitation of the streptomycin, the resulting precipitate (pentachlorophenol salts of the impurities: e. g., putrescine-dipentachlorophenate and the pentachlorophenol salt of the coloring matter) is removed by filtration, more of the solution of sodium-pentachlorophenate is then charged to this filtrate until the test shows complete precipitation, the precipitate is separated by filtration, washed with water and is dissolved in methanol. The insoluble impurities are filtered off and the methanolic sulfuric acid is added dropwise to the filtrate with stirring. The final pH of the solution is usually about 5.5. The methanol insoluble streptomycin sulfate is then precipitated almost quantitatively and is filtered, leaving the methanol-soluble pentachlorophenol in the filtrate. The recovery of the streptomycin trihydrochloride calcium chloride double salt from the streptomycin-pentachlorophenate can be carried out readily in accordance with this invention as follows: The crude precipitate of streptomycin-pentachlorophenate is dissolved in acetone and insoluble impurities are filtered off. To this filtrate an amount of calcium chloride is added which is sufficient to react with the streptomycin-pentachlorophenate to form calcium-pentachlorophenate and streptomycin trihydrochloride calcium chloride double salt at room temperature with stirring. The streptomycin trihydrochloride calcium chloride double salt, which precipitates immediately, is filtered, washed with acetone, followed with ethanol. The double salt may be further purified by dissolving in hot methanol and cooled.

The following examples illustrate various methods of carrying out the present invention, but it is to be understood that these examples are given by way of illustration and not of limitation.

*Example 1*

About 150 liters of clarified streptomycin broth assaying 1000 u./ml. are passed through a column containing 700 grams of cation exchange resin which is converted to the sodium salt. The spent broth assays 25 u./ml. The column is washed with water and the absorbed streptomycin is eluted from the column by passing through 15 liters of water containing 150 ml. of concentrated hydrochloric acid. The eluate is adjusted to pH 5.5 with aqueous sodium hydroxide solution, and then concentrated in vacuo to about 1/7 of its original volume. The precipitated salts are removed by filtration, 15% aqueous sodium-pentachlorophenate solution is added to this filtrate until no more precipitate is formed. The batch is stirred for a half hour, and the precipitate is washed with water and separated by centrifuging, the precipitation efficiency being about 90%. 400 grams of the dried precipitate (streptomycin-pentachlorophenate) are dissolved in 90% methanol at 10–30° C., in the ratio of 10 grams of streptomycin-pentachlorophenate per 70 ml. of 90% methanol; the insoluble impurities are filtered off. To this filtrate about 10% of the methanolic sulfuric acid calculated as necessary to completely precipitate the streptomycin is added. The mixture is thoroughly agitated, filtered, and then the precipitate (1st. precipitate) is washed with methanol and methanolic sulfuric acid (80% of the calculated amount) is further added to the above filtrate, and the precipitate (2nd precipitate) is filtered, and washed with methanol. Finally, methanolic sulfuric acid is added to the filtrate to completely precipitate the remaining streptomycin until the pH of this solution is adjusted to 5.5. This precipitate (3rd precipitate) is filtered, and washed with methanol. Each of the above three precipitates is dissolved in water adjusting the pH to 5.5 with aqueous sulfuric acid, the resulting precipitate (free pentachlorophenol) is filtered off, and each solution poured into methanol in order to precipitate the streptomycin sulfate and the precipitate is dried under diminished pressure. The above three precipitates are found to have the following properties:

|  | 1st Precipitate | 2nd Precipitate | 3rd Precipitate |
| --- | --- | --- | --- |
| Weight, grams | 15.0 | 130.0 | 10.0 |
| Potency, u./mg | 605 | 760 | 770 |
| $LD_0$ [1] | 450 | 2,000 | 1,950 |
| Histamine [2] | 0.4 | 0.5 | 1.1 |

[1] The term $LD_0$ denotes the maximum number of micrograms of streptomycin (in terms of free streptomycin base) that can be intravenously injected into a selected number of 20-gram mice and cause no deaths.
[2] The term "histamine" denotes the comparative value as mentioned as follows: The drop in millimeters in blood pressure obtained with 3 mg. (potency) of streptomycin per kg. of cat body weight is compared with that obtained with 0.1 mg. of histamine base per kg. of body weight.

*Example 2*

100 grams of streptomycin trihydrochloride isolated from fermentation broth by a carbon adsorption and elution, and having a potency of 300 u./mg. are disholved in 350 ml. of water. The solution is charged with 15% of the total volume of a 20% aqueous solution of sodium-pentabromophenate required for precipitation of the streptomycin. After this portion of the sodium-pentabromophenate has been added, the resulting precipitate (1st precipitate) is removed by filtration, and more of the solution of sodium-pentabromophenate is then charged to this filtrate, until the test shows complete precipitation. The batch is stirred for 15 minutes, and the precipitate is recovered by filtration. The dried precipitate is dissolved in 100 ml. of n-butanol, insoluble impurities are filtered off. To this filtrate about 10% of the aqueous sulfuric acid calculated as necessary to completely regenerate the streptomycin is added. The mixture is thoroughly agitated, the separated water phase, after adjusting pH to 5.5 with sulfuric acid, is poured into methanol, the resulting precipitate (2nd precipitate) is washed with methanol and is dried under diminished pressure. Aqueous sulfuric acid (80% of the calculated amount) is further added to the above n-butanol phase, and the water phase, after adjusting pH to 5.5 with sulfuric acid), is poured into methanol, the resulting precipitate (3rd precipitate) is washed with methanol and is dried under diminished pressure. Finally, aqueous sulfuric acid is added to the n-butanol phase to completely regenerate the remaining streptomycin until the pH of the water phase is adjusted to 5.4, and the water phase is poured into methanol, the resulting precipitate (4th precipitate) is washed wtih methanol and is dried under diminished pressure. The above 4 precipitates are found to have the following properties:

| | Regenerated [1] 1st Precipitate | 2nd Precipitate | 3rd Precipitate | 4th Precipitate |
|---|---|---|---|---|
| weight, grams | 2.0 | 3.0 | 25.0 | 2.0 |
| potency, u/mg | 250 | 600 | 760 | 780 |
| $LD_0$ | 1,800 | 500 | 2,000 | 2,000 |
| histamine | 1.2 | 0.2 | 0.2 | 1.0 |

[1] The term "regenerated" denotes the crude streptomycin sulfate regenerated from the 1st precipitate by adding aqueous sulfuric acid.

Example 3

About 50 grams of streptomycin trihydrochloride, isolated from fermentation broth by a carbon absorption and elution, and having a potency of 400 u./mg. are dissolved in 400 ml. of methanol. 30 grams of sodium-pentachlorophenate is added to this solution. The precipitated sodium chloride and impurities are filtered, and washed with 50 ml. of methanol. Recovery of highly-purified streptomycin salt from this filtrate is worked up as described in Example 1.

Example 4

About 50 grams of streptomycin trihydrochloride, isolated from fermentation broth by a carbon absorption and elution, and having a potency of 400 u./mg. are dissolved in 250 ml. of water. 32 grams of sodium-pentachlorophenate is added to this solution during continuous stirring. The resulting precipitate is removed by filtration, and is washed with two 80 ml. portions of water. Recovery of substantially pure streptomycin salt from this precipitate is accomplished as described in Examples 1 and 2.

Example 5

100 grams of streptomycin sulfate isolated from fermentation broth by a carbon absorption and elution, and having a potency of 250 u./mg. are dissolved in 300 ml. of water. The solution is charged with 15% of the total volume of a 23% aqueous solution of sodium-pentachlorophenate required for precipitation of the streptomycin, the resulting precipitate is removed by filtration, more of the solution of sodium-pentachlorophenate is then charged to this filtrate, until the test shows complete precipitation, and the precipitate is recovered by filtration. The dried precipitate is dissolved in 500 ml. of acetone and insoluble impurities are filtered off. 8.5 grams of calcium chloride in 70 ml. isopropanol are added to this filtrate, the streptomycin trihydrochloride calcium chloride double salt is precipitated immediately, is recovered by filtration, washed with acetone followed with ethanol. This precipitate is purified by dissolving in hot methanol and cooled, the resulting crystals are recrystallized once again from hot methanol. These crystals after separation by filtration, washing with methanol and ethanol and drying in vacuo at 56° C. have a rotation $[\alpha]_D^{25} = -75°$ (C, 1.0% in water) and a potency of 750 u./mg.

As many apparently widely different embodiments of this invention may be made without departing from the spirit and scope hereof, it is to be understood that this invention is not limited to the specific embodiments hereof, except as defined in the appended claims.

What we claim is:

1. A process of obtaining highly-purified streptomycin salt which comprises treating impure streptomycin with an alkali salt of a polyhalophenol containing at least 4 halogen substituents in water to form a salt-type combination product of streptomycin and the polyhalophenol which separates as a precipitate, recovering the precipitate thus formed and dissolving said precipitate in an organic solvent therefor selected from the group consisting of aliphatic alcohols, aliphatic ketones, hydrocarbons, and halogenated hydrocarbons to form a solution of the streptomycin polyhalophenolate, treating the solution with a water-soluble acid to precipitate the streptomycin from said solution as an acid salt, said acid being added stepwise to form a plurality of precipitates of the streptomycin salt, and dissolving each of the plurality of precipitates in water, and reprecipitating said precipitates.

2. A process of obtaining highly-purified streptomycin salt which comprises treating impure streptomycin with an alkali salt of a pentachlorophenol in water to form a salt-type combination product of streptomycin and the pentachlorophenol which separates as a precipitate, recovering the precipitate thus formed and dissolving said precipitate in an organic solvent therefor selected from the group consisting of aliphatic alcohols, aliphatic ketones, hydrocarbons, and halogenated hydrocarbons to form a solution of the streptomycin pentachlorophenolate, treating the solution with a water-soluble acid to precipitate the streptomycin from said solution as an acid salt, said acid being added stepwise to form a plurality of precipitates of the streptomycin salt, dissolving each of the plurality of precipitates in water, and reprecipitating said precipitates.

3. A process of obtaining highly-purified streptomycin salt which comprises treating impure streptomycin with an alkali salt of a pentabromophenol in water to form a salt-type combination product of streptomycin and the pentabromophenol which separates as a precipitate, recovering the precipitate thus formed and dissolving said precipitate in an organic solvent therefor selected from the group consisting of aliphatic alcohols, aliphatic ketones, hydrocarbons, and halogenated hydrocarbons to form a solution of the streptomycin pentabromophenolate, treating the solution with a water-soluble acid to precipitate the streptomycin from said solution as an acid salt, said acid being added stepwise to form a plurality of precipitates of the streptomycin salt, dissolving each of the plurality of precipitates in water, and reprecipitating said precipitates.

4. A process of obtaining highly-purified streptomycin salt which comprises treating impure streptomycin with an alkali salt of a polyhalophenol containing at least 4 halogen substituents in a solution in water to form a salt-type combination product of streptomycin and the polyhalophenol which separates as a precipitate, the alkali salt of the polyhalophenol being in stoichiometric amount with respect to the streptomycin activity of the solution, recovering the precipitate thus formed and dissolving said precipitate in an organic solvent therefor selected from the group consisting of aliphatic alcohols, aliphatic ketones, hydrocarbons, and halogenated hydrocarbons to form a solution of the streptomycin polyhalophenolate, treating the solution with a water-soluble acid to precipitate the streptomycin from said solution as an acid salt, said acid being added stepwise to form a plurality of precipitates of the streptomycin salt, dissolving each of the plurality of precipitates in water, and reprecipitating said precipitates.

5. A process of obtaining highly-purified streptomycin salt which comprises treating impure streptomycin with an alkali salt of a polyhalophenol containing at least 4 halogen substituents in water with a portion of the total volume of an alkali salt of the polyhalophenol required for precipitation of the streptomycin completely, whereby impurities are selectively precipitated, and adding the remainder of the polyhalophenol to form a salt-type combination product of streptomycin and the polyhalophenol which separates as a precipitate, recovering the streptomycin-polyhalophenol precipitate thus formed and dissolving said precipitate in an organic solvent therefor selected from the group consisting of aliphatic alcohols, aliphatic ketones, hydrocarbons, and halogenated hydrocarbons to form a solution of the streptomycin polyhalophenolate, treating the solution with a water soluble acid to precipitate the streptomycin from said solution as an acid salt, said acid being added stepwise to form a plurality of precipitates of the streptomycin salt, and dissolving each of the plurality of precipitates in water, and reprecipitating said precipitates.

6. A process of obtaining highly-purified streptomycin salt which comprises treating impure streptomycin with an alkali salt of a polyhalophenol containing at least 4 halogen substituents in water to form a salt-type combination product of streptomycin and the polyhalophenol which separates as a precipitate, recovering the precipitate thus formed and dissolving said precipitate in an organic solvent therefor selected from the group consisting of aliphatic alcohols, aliphatic ketones, hydrocarbons, and halogenated hydrocarbons to form a solution of the streptomycin polyhalophenolate, treating the solution with a water-soluble acid selected from the group consisting of sulfuric, hydrochloric, phosphoric, acetic, lactic and citric acids, to precipitate the streptomycin from said solution as an acid salt, said acid being added stepwise to form a plurality of precipitates of the streptomycin salt, and dissolving each of the plurality of precipitates in water, and reprecipitating said precipitates.

7. A process of obtaining highly-purified streptomycin salt which comprises treating impure streptomycin with an alkali salt of a polyhalophenol containing at least 4 halogen substituents in water to form a salt-type combination product of streptomycin and the polyhalophenol which separates as a precipitate, recovering the precipitate thus formed and dissolving said precipitate in methanol to form a solution of the streptomycin polyhalophenolate, treating the solution with sulfuric acid to precipitate the streptomycin from said solution as an acid salt, said acid being added stepwise to form a plurality of precipitates of the streptomycin salt, and dissolving each of the plurality of precipitates in water, and reprecipitating said precipitates.

8. A process of obtaining highly-purified streptomycin salt which comprises treating impure streptomycin with an alkali salt of a polyhalophenol containing at least 4 halogen substituents in water with a portion of the total volume of an alkali salt of the polyhalophenol required for precipitation of the streptomycin completely, whereby impurities are selectively precipitated, and adding the remainder of the polyhalophenol to form a salt-type combination product of streptomycin and the polyhalophenol which separates as a precipitate.

References Cited in the file of this patent

UNITED STATES PATENTS

| | | |
|---|---|---|
| 2,462,175 | Folkers | Feb. 22, 1949 |
| 2,480,611 | Sheehan et al. | Aug. 30, 1949 |
| 2,501,014 | Wintersteiner et al. | Mar. 21, 1950 |
| 2,537,933 | Lott et al. | Jan. 9, 1951 |
| 2,538,847 | Regna et al. | Jan. 23, 1951 |
| 2,555,760 | Regna et al. | June 5, 1951 |
| 2,555,761 | Regna et al. | June 5, 1951 |
| 2,643,249 | Heuser | June 23, 1953 |